Aug. 12, 1941.  A. W. ROSEN  2,252,579
THERMOMETER SUPPORT FOR AUTOMOBILES
Filed March 26, 1941
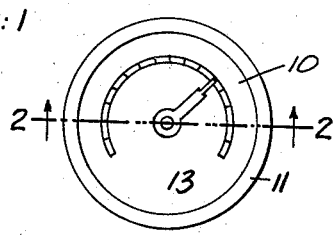
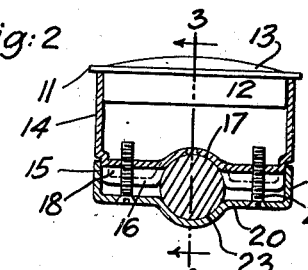
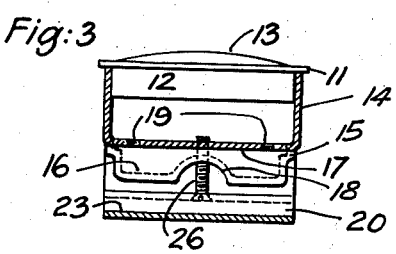
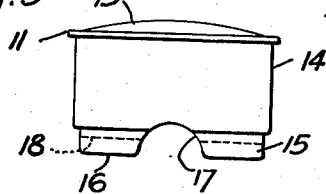
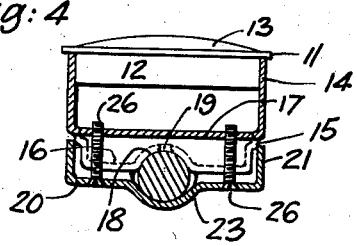
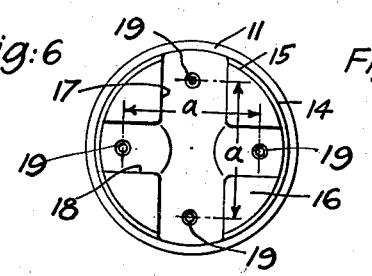
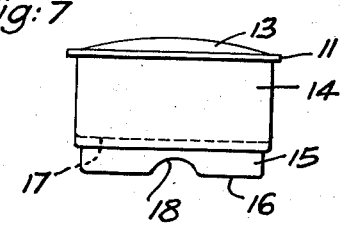
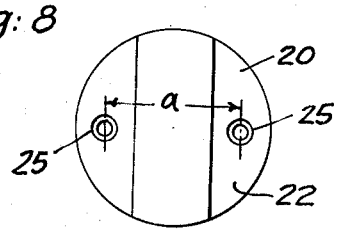
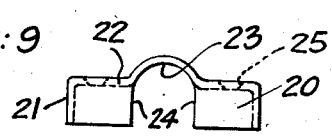
Abraham W. Rosen
INVENTOR
BY Walter E. Wollheim
ATTORNEY.

Patented Aug. 12, 1941

2,252,579

UNITED STATES PATENT OFFICE 2,252,579

THERMOMETER SUPPORT FOR AUTOMOBILES

Abraham W. Rosen, New York, N. Y.

Application March 26, 1941, Serial No. 385,227

3 Claims. (Cl. 248—230)

This invention relates to supports of circular thermometers or other indicating mechanisms which are adapted to be fastened to aerial rods, mirror posts, gear shift levers, or other parts of automobiles.

In such supports as made heretofore, it was necessary to provide different clamping means for a thermometer, according to whether the parts upon which the thermometer was to be fastened were essentially horizontally or vertically disposed, so as to place the thermometer in always the same readable position convenient to the driver. Or else the position of the thermometer had to be especially adjusted to a convenient position by men skilled in this work.

It is the principal object of the invention to provide a universal support for a thermometer or the like which can be attached to either a horizontally or vertically disposed rod or member without changing the position of the thermometer with respect to the driver.

Another object is to make the support readily attachable, removable and changeable for either position.

A further object is to make the support adaptable for clamping to different sized rods, inasmuch as various parts of an automobile suitable for the reception of the supports may vary in diameters from ¼" to ⅜", for instance.

Still another object is to provide in such supports a simple and inexpensive construction, attractive in appearance, and dependable in use.

With these and other objects in view, a preferred embodiment of the invention is shown in the accompanying drawing in which Fig. 1 is a plan view of the thermometer in its casing.

Fig. 2 is a view, partly in section, along the plane of line 2—2 in Fig. 1 with the rod upon which the casing is mounted also indicated in section;

Fig. 3 is a similar view, with the rod omitted, along the plane of line 3—3 in Fig. 2.

Fig. 4 is a sectional view similar to that shown in Fig. 3, except that the casing is mounted upon a rod of smaller diameter and substantially at right angles to the one shown in Fig. 2, the rod also being shown in section;

Fig. 5 is a side view of the thermometer in its casing;

Fig. 6 is a bottom view of the same;

Fig. 7 is a side view at right angles to the one shown in Fig. 5;

Fig. 8 is a bottom view of the clamping member for the casing; and

Fig. 9 is a side view of the same.

Like characters of reference denote similar parts throughout the several views and the following specification.

10 is a circular type of thermometer having a flange 11 and a depending skirt 12. Below a bevelled glass or other transparent member 13 is a dial and a movable pointer actuated by mechanism well known in the art and disposed below the dial and within the skirt 12.

14 is a substantially cylindrically-shaped casing having a reduced portion 15 closed at its bottom at 16 and provided with a relatively deep and substantially semi-circular groove 17 and at right angles thereto with a relatively shallow similarly shaped groove 18. Near the outer ends of each of the grooves are located tapped holes 19 equidistant from the longitudinal axis of the cylindrical casing 14, as in Fig. 6 in which the dimensions $a$ are equal and at the same time symmetrical to the longitudinal axis of the casing. The thermometer 10 is pressed tightly within the open top of casing 14, with flange 11 abutting its top edge.

20 is a clamping member of substantially cup-shape having sides 21 snugly fitting over the reduced portion 15 of the casing 14, its outer surface being practically a continuation of the larger diameter of casing 14. Its bottom 22 is provided with a transversely disposed and substantially semi-circular groove 23, portions of sides 21 being cut away at 24 to correspond with the width of the groove. The diameter of groove 23 is approximately the same as that of deep groove 17 in the bottom of casing 14. 25 are, preferably countersunk, holes substantially at right angles to the direction of groove 23 and equidistant therefrom and spaced apart the same as holes 19 in the grooves 17 and 18 in the casing 14 with either set of which holes 25 are in register.

26 are screws with countersunk heads adapted to fit holes 25, while their threaded portions are long enough to engage tapped holes 19 in either grooves 17 or 18 in casing 14.

In applying the thermometer to a rod or tubular member of relatively large diameter, I clamp the rod within groove 17 at the bottom of the casing 14 and the groove 23 of the member 20 by drawing up on the screws 26 in holes 19 in the groove 18, until the rod is securely clamped to the casing. It is obvious that before securely clamping the rod thereto, the casing 14 with the thermometer may be swiveled about the rod, should it be found desirable to place the thermometer in a better readable position.

Should it be advantageous to support the thermometer upon a rod of perhaps smaller diameter and at substantially right angles to the position explained hereinabove without changing the relation of the readability of the thermometer dial with respect to the driver of an automobile, for instance, I merely bring this smaller rod in contact with the shallow groove 18, at right angles to groove 17, and by means of screws 26 draw up the rod against the casing by the same clamping member 20, the depth of the shallow groove 18 compensating for the smaller diameter of the rod. Swiveling around the rod to adjust the position of the dial can be achieved in the same manner as explained heretofore.

It is now clearly apparent that, when facing the dial, the casing with the thermometer may be fastened to either a vertical rod or to a horizontal rod without in any manner changing the position of the thermometer in the casing with respect to an observer. This is of particular advantage because the thermometer is generally tightly pressed into the casing and cannot be shifted by the average user. Moreover, I am not limited to any one size of rod support, but by providing shallow and deep grooves in angular relation to each other, I am able to clamp the casing upon any convenient tubular or rodlike part of a car, such as for instance, aerials, mirror supports, gear shift levers and the like, and in all cases provide for ready observation of the thermometer dial in the position most convenient to the driver. In other words, a single clamping means has been provided which is of universal application in that it enables fastening of the thermometer to either horizontal or vertical supports of varying sizes.

It is obvious that, while I have shown and described the invention as especially applicable to a thermometer, it can readily be adapted to, for instance, the support of a clock, or other indicating mechanism in dial form. The term "thermometer" therefore should not be restrictive but is to cover any indicating mechanism which could be fastened to a part of an automobile convenient for observation by the driver.

I want it understood that various changes in form, proportions and minor details of construction may be resorted to without departing from the principles or sacrificing any of the advantages of the invention as defined in the appended claims.

What I claim as new is:

1. Clamping means for a circular indicating mechanism comprising a cup carrying said mechanism and having a bottom provided with a plurality of grooves of varying sizes in angular relation to each other for the reception of a support member in selected grooves, a clamping element having a single groove, and means to draw said element tightly against said cup and its single groove in clamping contact with said member.

2. Clamping means for a circular indicating mechanism comprising a cup carrying said mechanism and having a bottom provided with an outer deep groove and a pair of outer aligned shallow grooves in angular relation to each other for the reception of a support member in selected grooves, a pair of tapped holes in said deep groove and a tapped hole in each of said shallow grooves, the distance between each hole of said pair and between each hole in the shallow grooves being the same and equidistant from an axis of intersection between said deep and shallow grooves, a clamping element having a single groove and a pair of holes spaced apart to register with the tapped holes in either said deep and shallow grooves, and screws projecting through the holes in said element adapted to engage the tapped holes in either said shallow or deep grooves for the purpose of drawing said element tightly against said cup and its single groove in clamping contact with said member when said member is disposed in either said deep or shallow grooves.

3. Clamping means for a circular indicating mechanism comprising a deep cup carrying said mechanism having its diameter slightly reduced near its bottom and its bottom provided with a plurality of outer grooves in angular relation to each other for the reception of a support member in selected grooves, a clamping element comprising a shallow cup having its sides snugly fit over the reduced sides of said deep cup and having a bottom with a single inner groove for the reception of said member, and means to draw said deep and shallow cups together and tightly against said member.

ABRAHAM W. ROSEN.